United States Patent [19]
Johnson

[11] 4,109,263
[45] Aug. 22, 1978

[54] COMPACT PRISM CAMERA
[75] Inventor: Bruce K. Johnson, Andover, Mass.
[73] Assignee: Polaroid Corporation, Cambridge, Mass.
[21] Appl. No.: 720,004
[22] Filed: Sep. 2, 1976
[51] Int. Cl.$^2$ ............................................. G03B 17/17
[52] U.S. Cl. ..................................... 354/150; 354/152
[58] Field of Search ............... 354/150, 152, 153, 154, 354/155, 156, 157, 158

[56] References Cited
U.S. PATENT DOCUMENTS
3,818,498  6/1974  Zehnpfennig ....................... 354/150

Primary Examiner—Edna Marie O'Connor
Attorney, Agent, or Firm—David R. Thornton

[57] ABSTRACT

A compact, rigid camera has a folded optical path between an objective lens and a film plane and formed at least in part with a prism element having an entrance face, an exit face overlying and closely spaced from the film plane, and a reflective face. The exit face both reflects light which enters the prism at the entrance face and transmits light out of the prism. The reflective face is inclined to return to the exit face, for transmission to the film plane, the entering light internally reflected at the exit face. The entrance face of the prism is inclined relative to the reflective/transmissive face by an angle larger than the relative inclination of the reflective face. Light transmitting prism surfaces, spacings between optical elements, light absorptive coatings, and mechanical light controlling elements including a light collimator, prevent the entry of unwanted nonfunctional light into the prism and eliminate such light that does enter the prism. In a preferred form, the prism is of a transparent, low dispersion plastic material, and the exit face is at least coextensive with the film plane.

30 Claims, 4 Drawing Figures

COMPACT PRISM CAMERA

BACKGROUND OF THE INVENTION

This invention relates to photographic apparatus and in particular to a compact, rigid camera that employs a prism in the optical image path. The invention is particularly suited for use with cameras that use self-developing film and accordingly is described with particular reference to such cameras. Features of the invention can, however, be used in other cameras.

Conventional snapshot cameras derive compactness principally from the use of film having a relatively small frame format and, in some instances, from a collapsing bellows arrangement. For 35-millimeter cameras, the film frame is typically 24 millimeters by 36 millimeters. Since the focal length of the objective lens of the camera is usually at least as long as the diagonal of the film frame to provide a useful angular field, the lens-to-film plane distance would then be of the order of at least 43 millimeters (approximately 1 and 11/16 inches). (Of course, wide angle lenses for 35 millimeter cameras can have a significantly shorter focal length.) In conventional cameras where the light from the lens follows a straight path in air to the film, the focal length is therefore a controlling limitation on the front to back dimension of the camera. A feature of this construction is that there is room for only one or two optically active surfaces between the lens and the film which can reflect or scatter light. This and the relatively small film format reduce the likelihood that stray light from outside the angular field of the lens, or other unwanted light, will reach the film.

The difficulties in achieving a camera having a compact size are greatly increased when the camera uses self-developing film, such as that marketed by the Polaroid Corporation. While in conventional photography, a relatively small negative can produce a relatively large print or viewable image by enlargement or projection, the exposed photographic area on self-developing film must, in most instances, be the same as that of the actual developed print. As a result, instant cameras, i.e. designed for use with self-developing film generally have a significantly longer focal length than that in compact cameras using conventional film. Also, instant cameras generally require a fairly high speed lens to provide sufficient light to expose the film at exposure times useful in hand held cameras for general purposes. These requirements for the exposure of self-developing film therefore present significant constraints on the design of a compact instant camera.

Early solutions to the problem of achieving compactness in an instant camera involved mechanical folding arrangements to move the objective lens in a direction perpendicular to the film plane. A folding bellows enclosed the camera space between the objective lens and the film plane. More recently, cameras developed and marketed by the Polaroid Corporation utilize a reflective element in the exposure chamber to fold the optical path between the lens and the film plane. A collapsible version of such a camera which achieves a high degree of compactness is described in U.S. Pat. No. 3,753,392. Another instant camera of this type which employs a reflective element is described in U.S. Pat. No. 3,938,167 and U.S. Pat. No. 3,940,774. This camera is noncollapsible, or rigid, and therefore has a lower cost of manufacture than the collapsible camera, but suffers from a comparatively bulky configuration for carrying purposes.

One problem with some of these cameras employing a reflective element is that the film upper surface, which typically is a thin sheet of transparent plastic material, reflects a portion of the light incident on the film. The reflective element redirects this film-reflected light back onto a different part of the film, causing overexposure at that part and loss of sharpness in the resultant photograph. While this problem is not severe in many situations, it can produce noticeable "flare" spots when the camera is used outdoors with a bright sky and is particularly acute when the subject is relatively dark.

U.S. Pat. No. 3,818,498 of Zehnpfennig discloses a compact camera designed for self-developing film and which employs a pair of spaced apart, mutually inclined reflective elements to generate a multiply-folded optical path. One of the elements is fully reflective, while the other is partially reflective. The partially reflective element overlies a selector element which overlies the film and is formed of mechanical light collimators held in a transparent medium. While this arrangement may achieve a highly folded optical path, it nevertheless suffers from several disadvantages. First, at least a portion of the light reaching the film plane undergoes multiple reflections from the partially reflective element. At each reflection the incident light looses a significant portion of its intensity. As a result, the intensity of the light reaching the film plane is generally low and of varying values depending on the number of reflections the light has undergone. Another problem is that the mechanical collimators of the selector element cast a shadow on the film plane or produce granularity, or defocus, or some other form of image degradation.

While the light folding properties of prisms are well known, the principal uses of prisms have been in non-photographic optical instruments such as binoculars, telescopes, periscopes, rangefinders and spectrometers. Many applications rely on the ability of a prism to redirect by total internal reflection light incident on a surface adjacent a medium of a lower index of refraction at an angle greater than a critical value. Common prisms which utilize this property are the Porro prisms (of first or second kinds) commonly employed in binoculars. Other common prism configurations such as Dove, Lehman and Amici prisms use total internal reflection for image inversion, field rotation or scanning. In these applications, while the incident light beam is reflected one or more times, and hence is to some extent "folded," the main purposes of the prism element are not to fold the optical path to achieve compactness, but rather to redirect, laterally displace, invert, split, combine or rotate the beam or beams.

One characteristic of a Schmidt prism, which is another prism that provides multiple internal reflections, is that a portion of one prism face can provide total internal reflection while another portion is transmissive. Schmidt prisms, single and in matched pairs, also have found applications in optical instruments. A discussion of some applications can be found in "Optical Systems for Telescopes and Binoculars" at pp. 435–471 of *Summary Technical Report of Division* 16, *NDRC, Vol. I, Optical Instruments* (1946). U.S. Pat. No. 3,471,685 to Kato et al discloses a matched pair of Schmidt prisms operating as a field rotator in a microscope. In Kato, as is common with optical instruments such as telescopes and periscopes, photograph apparatus can be attached to the eyepiece to record the output image of the instrument.

Heretofore, prisms have been used in cameras principally as image directing elements in viewfinders. For example, many 35-millimeter single lens reflex cameras employ a roof pentaprism to direct light from a deviating mirror to the viewfinder eyepiece. U.S. Pat. No. 3,819,255 to Matui discloses a more complex viewfinder structure employing an opposed pair of Schmidt prisms that are mutually rotatable about a fixed pivot with an air gap separating the opposed faces. A portion of each opposed face internally reflects the incident light beam and another portion transmits or receives the light beam. It is noteworthy, however, that the light transmission through these prisms is over a relatively small portion of the opposed prism faces. Further, the light transmission to a viewfinder does not require the optical quality or transmission efficiency necessary for light transmission to photographic film. Also, unwanted or stray light, and the loss of light intensity, are not as critical in viewfinder optics as in the image-path optics of a camera.

U.S. Pat. No. 3,784,645 to Grey and U.S. Pat. No. 3,911,692 to Grey et al disclose prism elements located within the exposure chamber of a camera and forming part of the optical path between the objective lens and the film plane. More specifically, these patents teach that prism elements be provided in a stereoscopic camera to lateraly displace two light beams, each originating at a separate objective lens, so that they are recomposed in a side by side relationship on two halves of a single film frame. This displacement function is roughly analogous to that of roof prism pairs in binoculars. These patents also deal with numerous optical design problems generated by the prism elements, including such prism characteristics as distortion, astigmatism, chromatic aberration, spherical aberration, light absorption, the weight of the prism elements, and the elimination and/or control of stray light. Another design consideration is that the use of prisms in cameras increases the back focal distance for a given focal length. The ability of a prism to fold the optical path particularly with a high index prism, however, can more than offset this increase. It should also be noted, however, that the "foldability" does not necessarily result in compactness.

In particular, these disclosures teach the desirability of spacing the exit face of each prism at a practical distance from the film plane to avoid abrasion and to avoid having dust or other irregularities present on the face of the prism cast a shadow on the film. The large spacing also has the advantage of allowing the use of smaller prisms, which in turn reduces the absorption of the light within the prism and reduces the weight which the prism elements add to the overall optical system. It is also clear from these disclosures that a material such as glass with a relatively high index of refraction, typically 1.6 or 1.7, is preferable to a plastic material — typically with an index of refraction only near 1.5 — both in terms of optical efficiency and of "foldability."

With this state of the art, it is a principal object of this invention to provide a camera for use with self-developing film and which is both rigid and highly compact.

Another object of this invention is to provide a camera that employs, in the image path, a prism having relatively few optically active surfaces and few critical tolerances.

A further object of the invention is to provide a rigid highly compact prism camera that effectively controls unwanted light.

Another object is to provide a camera with the foregoing advantages and which utilizes a prism of plastic material.

It is also an object of the invention to provide a compact instant camera that greatly reduces "flare" problems due to light reflected from the film surface while having an improved level of image brightness and uniform light distribution.

A further object of the invention is to provide a highly compact instant camera that allows flexibility in the alignment of the optical axis of the objective lens with respect to the film plane.

Still another object of the invention is to provide a rigid, highly compact instant camera having a streamlined, aesthetically pleasing configuration that is convenient to use, carry and store.

SUMMARY OF THE INVENTION

A camera adapted for use with self-developing film has a prism element that folds the optical path of useful light rays between an objective lens and the film plane within a highly compact volume. The prism has an entrance face that is in light-receiving optical alignment with the lens, an exit face overlying and closely spaced from the film plane, and a reflectively coated face extending, in triangular fashion, between the entrance face and the exit face. The exit face is both internally reflective and transmissive to light travelling along the image path. In particular, light rays entering the prism from within the field angle of the lens are totally internally reflected at the exit face. The reflective face is oriented to return this internally reflected light back to the exit face substantially along its perpendicular for transmission to the film plane.

The intersections of the entrance face and of the reflective face with the exit face form first and second angles, respectively, with the first angle being greater than the second angle. In a preferred form, an initial mirror element directs light from the lens to the entrance face substantially along its perpendicular. Further, a portion of the exit face adjacent the entrance face is coated with a reflective material to direct to the reflective face those rays which strike the exit face at less than the critical angle.

These and other features and objects of the invention will be more fully understood from the following detailed description of preferred embodiments, which should be read in conjunction with the accompanying drawings.

DETAILED DESCRIPTION OF ILLUSTRATED EMBODIMENTS

Figure 1:
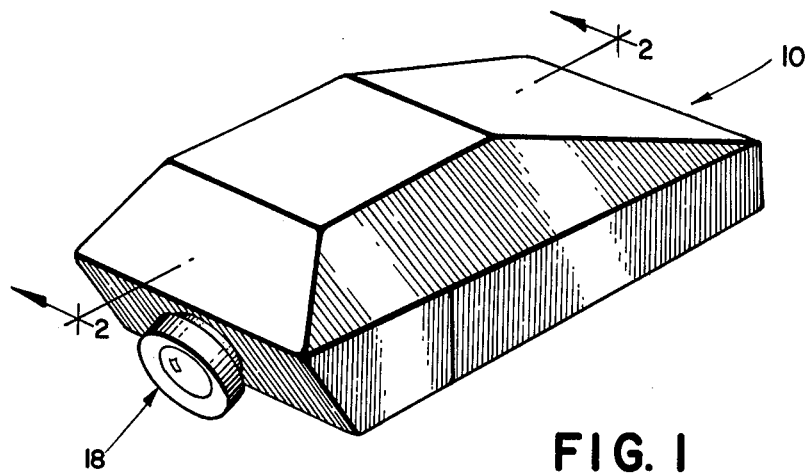
FIG. 1 is a simplified perspective view of a compact prism camera according to the invention.
Figure 2:
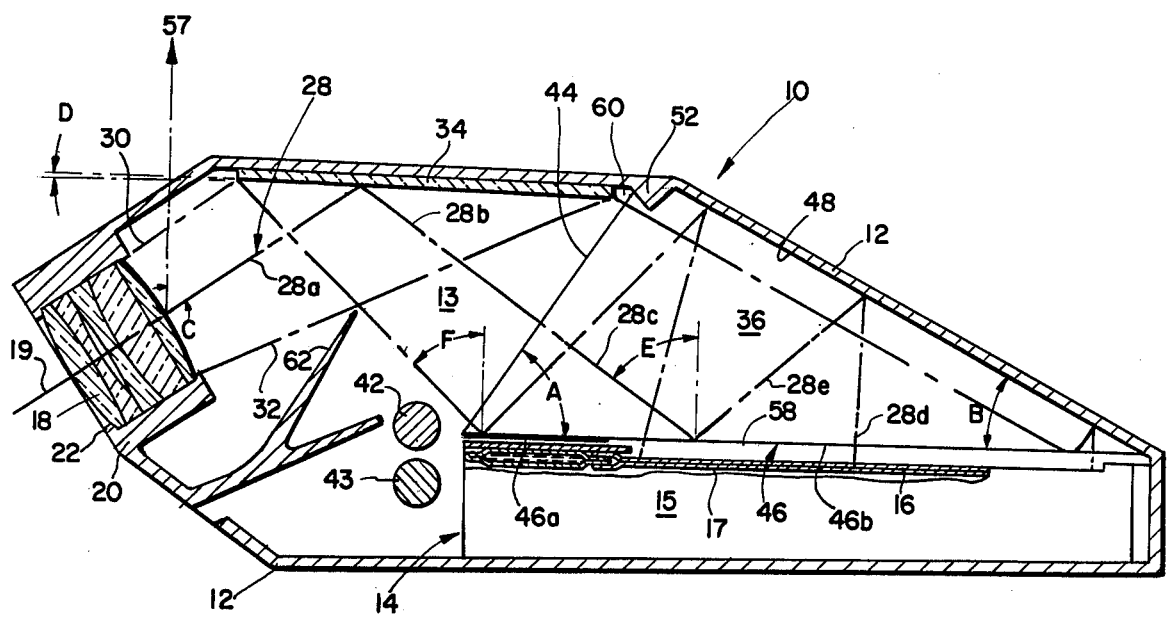
FIG. 2 is a view in vertical section taken along the line 2—2 of FIG. 1.

FIGS. 1 and 2 show a camera 10 according to the invention having a rigid housing 12 that is light tight except at selected openings and that supports various optical and mechanical elements. In general the camera 10 is of the type disclosed in the currently assigned, co-pending application of James G. Baker entitled "Prism Camera," (Ser. No. 720,008) filed on even date herewith, the disclosure of which is incorporated by reference. The housing forms an exposure chamber 13, and a compartment 14 for supporting, along one wall of this chamber, a cassette 15 of self-developing film units. The film cassette 15 is preferably of the type available for the camera marketed by the Polaroid Corporation under the registered designation SX-70. The uppermost film unit in the cassette is presented for exposure with its upper light-sensitive surface lying in and coextensive with a film plane 16.

Figure 3:
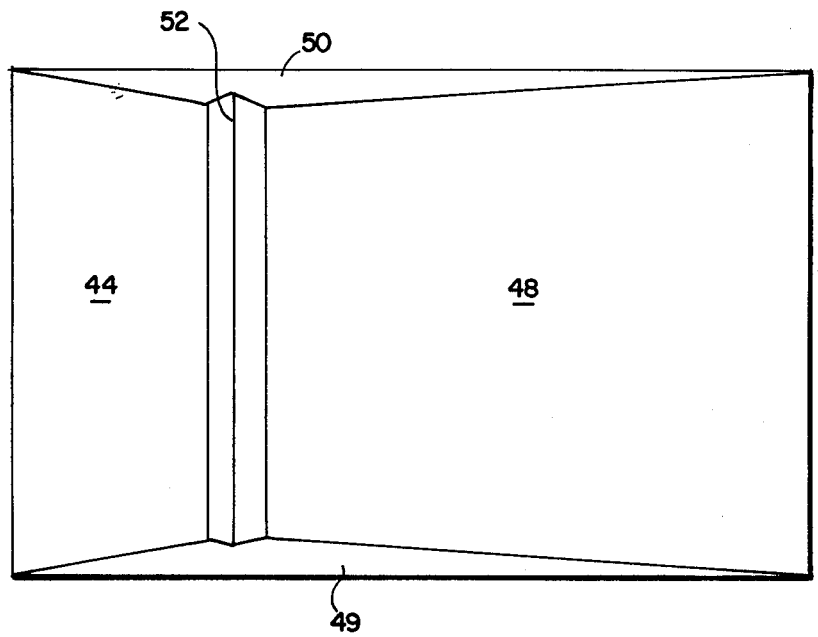
FIG. 3 is a top plan view of the prism element shown in FIG. 2.

With reference to FIGS. 2-3, the housing 12 supports an objective lens 18 having an optical axis 19 and mounted in a support structure 20. A frontal portion 22 of the structure 20, adjacent the front-surface of the lens 18, forms a field stop, the design of which is well known to those skilled in the art. Opening 24 in the structure 20 adjacent the exit surface of the lens 18 forms an aperture stop, also of well known design. The lens 18 and the stops define an angular field of view in object space external to the camera, and form an exit pupil or diverging beam of light rays in image or camera space. The beam of useful light rays is represented in FIG. 2 by three light rays, a chief ray 28 that is generally coincident with the optical axis 19, and a pair of extreme rays 30 and 32 that represent light rays originating from the extreme upper and lower edges, respectively, of the angular field of view. Each of these rays is directed along a folded optical path between the lens 18 and the film plane 16 by a mirror 34 and a prism 36 of generally triangular cross section in a plane such as that of FIG. 2.

The camera 10 and the other embodiments of the invention described below typically include other elements which for clarity of description are not shown. These elements, which may be of conventional design, include a shutter, a viewfinder, focus adjustment means, and means for advancing units out of the film cassette 15 for processing. An opposed pair of spread rollers 42, 43 receives an exposed film unit removed from the cassette in this manner, and initiates the development process in a well known manner. Means, not shown, are also provided for opening the film compartment 14 to facilitate insertion and removal of the cassette 15. Suitable new constructions for some of these elements are described in the following co-pending commonly assigned applications of L. M. Douglas filed on even date herewith: "Compact Self-Developing Camera With Folded Optical Image Path", Ser. No. (720,054); "Selective Closure of Camera Viewfinder and Camera Incorporating Same", Ser. No. (720,047); "Camera With Movable Film Drive and Optical Unit", Ser. No. (720,006); and "Film Advance Mechanism", Ser. No. (720,007).

A principal feature of this invention is the beam folding prism 36 in the exposure chamber 13 and which defines at least part of the optical path between the lens and the film plane. With particular reference to FIGS. 2 and 3, the prism 36 is a block of a transparent optical material with a generally triangular cross section. The prism has three main optically active faces, an entrance face 44, an exit or reflective/transmissive face 46 that intersects the entrance face 44 at an acute angle A, and a reflective roof face 48 that intersects the exit face at an acute angle B smaller than angle A. The exit face has a front portion 46a (i.e., a portion located, along the length of the exit face, adjacent the angle A and shown on the left side of FIG. 2) that is coated with a reflective material, and a rear portion 46b that is preferably optically finished and coated for low reflection. The entrance face 44 preferably also has a clear polish finish, and each optically active face 44, 46, 48 is preferably highly flat, especially the entrance face 44 and the reflective roof face 48.

In general the dimensions of the prism are selected to enhance the compactness of the camera, reduce its weight, and facilitate the folding of the light beam while avoiding vignetting. More particularly, as shown in FIG. 3 the sides 49 and 50 of the illustrated prism 36 are trimmed to reduce the prism bulk. At least one lateral step-like serration 52 extends between the upper edge of the entrance face 44 to the forward edge of the roof face 48.

The exit face portion 46b, on the prism portion 36b, overlies and is closely spaced from the film plane 16. This face portion is at least coextensive with the film plane 16 and preferably extends laterally beyond all the edges of the film 17.

The exit face portion 46a and the roof face 48 are both coated, using well-known techniques, with a reflective material such as aluminum or silver. While a silver coating reflects approximately 98% of the incident light and a similar aluminum coating is 90% efficient, aluminum is generally preferred for reasons of durability and adhesion. The configuration of the prism 36 of this invention is particularly conducive to use of aluminum since it requires few front surface reflectors and therefore the light intensity is not unduly diminished by these reflections. The serration 52 and the side surfaces 49 and 50 are preferably coated with a light absorbant material, preferably a black, index-matching paint.

The operation of the foregoing prism optical system can be understood through a consideration of its action on the rays 28, 30 and 32, as FIG. 3 shows. As it emerges from the lens 18, the principal or chief ray 28 is coincident with the lens optical axis 19 and forms an angle C with respect to the vertical, indicated by the arrow 57 and chosen to be coincident with the perpendicular or normal to the film plane. The ray 28 proceeds in air to the mirror 34 where it is reflected onto the entrance face 44. The optical axis 19, the angle of inclination D of the mirror 34 with respect to the vertical (arrow 57), and the angle of inclination A of the entrance face 44 are preferably chosen so that the ray 28 strikes the entrance face substantially along its perpendicular. With this configuration, since the exit pupil or image space light ray beam is generally in the shape of a diverging cone, the extreme rays 30 and 32 strike the face 44 at symmetrically small angles of incidence and hence enter the prism with slight refraction. In general it is desirable to minimize the angle of incidence to maximize the light transmission into the prism and to minimize the introduction of aberrations by the prism, such as chromatic aberration. While it will be understood that the lens 18 is designed to compensate for these prism aberrations, minimizing them facilitates the lens design and improves the image quality. It should also be noted that any undulations or departures from flatness in the entrance surface 44 will distort portions of the image formed at the film plane.

Within the prism 36, the principal ray 28 strikes the exit face portion 46b at an angle E that exceeds the critical angle of the prism material so that the ray is totally internally reflected toward the reflective surface 48. (For the purposes of this description, "internally reflected" means reflected by total internal reflection.) The total internal reflection transmits 100% of the incident light energy to the face 48.

The extreme rays 30 and 32 are refracted upon entering the prism and then proceed along straight line paths to the exit face 46. Although refraction by the prism increases the optical path length for these rays between the lens and the image plane, this lengthening is more than compensated by the folding of the optical path by the prism. The extreme ray 32 undergoes total internal reflection at the exit face portion 46b. However, to optimize the compactness of the prism, and hence of the camera 10, the extreme ray 30 strikes the exit face 46 at an angle F which is less than the critical angle. The reflective coating on the exit face portion 46a nevertheless redirects this ray to the face 48. The exit face portion 46a similarly reflects other rays of the light beam which lie between the ray 28 and the ray 30 and which would be at least partially transmitted from the prism but for the reflective coating. It will be understood that the longitudinal extent of the reflectively-coated face portion 46a is dependent in a known manner on a number of factors such as the index of refraction of the prism material, the slope of the entrance face (the angle A), the parameters of the objective lens 18, and the film format.

The rays 28, 30 and 32 reflected at the exit face 46 proceed to the roof face 48 where they are reflected back towards the exit face. The roof face 48 is angled with respect to the exit face 46 (angle B) so that ray 28 is reflected to travel to the exit face substantially along the perpendicular to that surface. As shown, the chief ray 28 strikes the face portion 46b directly along the perpendicular and the rays 30 and 32 strike it at high angles of incidence. All rays are accordingly transmitted through the face 46b with minimal disturbance, and travel across narrow air gap 58 to expose the film unit lying in the film plane. Although it is not essential that the transmitted rays be perpendicular to the exit face, this relationship is desirable to minimize dispersion, distortion, and astigmatism.

The exit face preferably is closely spaced from the film plane to minimize the overall height of the camera and to avoid magnification of image distortions. On the other hand, the spacing should be sufficiently wide to avoid abrasion of the exit face by the film as each unit is withdrawn from the cassette and to avoid imaging of dust particles on the exit face. A suitable spacing is around 2.0 millimeters. Since the exit face is extremely close to the image plane, it is important that this face be free of dust, scratches, finger prints and other foreign matter or irregularities that would cast a shadow on the film. While the gap or spacing 58 is preferably uniform, i.e. the face 46 is preferably parallel to the image plane 16, the exit face 46 can be inclined with respect to the film plane to yield a wedge-shaped gap. As with the parallel spacing, the face to film distance should not be narrow enough to abrade the face or wide enough to magnify image distortions or foreign matter on the exit face.

One advantage of the prism arrangement is that relatively little of the light reflected from the film is redirected back to it to expose another area of the film. This improvement stems from the fact that light reflected by the film back into the prism through the exit face is precluded by the exit face (by internal reflection) from re-exiting from the prism to the film and the action on the film-reflected light of the low reflection coating applied to the exit face. The present camera arrangement thus reduces by at least a factor of ten the "flare" problem associated with some prior instant cameras employing a path-folding reflective element.

When prisms are utilized in the image path optics of a camera in accordance with the invention it is desirable to control unwanted light that may reach and hence undesirably expose the film. A particularly troublesome problem in photographic apparatus is stray light which enters the objective lens from outside its angular field. With the alignment of optical elements shown in FIG. 2, light originating from the lower portion of the field and proceeding generally in an upward direction along the arrow 57 does not present a problem. This stray light lies "outside" the extreme ray 30 from the chief ray 28. It will either fail to strike the mirror 34 and therefore be absorbed by the inner surface of the housing or some other light absorptive surface, or it will strike the forward edge of the mirror 34 and be reflected at an angle such that it fails to enter the prism. Stray light from the lateral portions of the field are readily absorbed by the prism side surfaces 49 and 50 (FIG. 3). For this purpose it is desirable to limit the maximum width of the prism at its base to a dimension equal to or slightly in excess of the width of the film plane. It should be understood, however, that an advantage of this invention is that comparatively large, wide film formats can be readily accommodated by increasing the width of the prism. Thus, for example, while a common film format is 80 millimeters by 80 millimeters, a camera according to this invention can be readily constructed to accommodate an 80 millimeter by 120 millimeter format.

On the other hand, stray light from the upper portion of the field, i.e. which lies outside the upper extreme ray 32 of the desired bundle of light, is more difficult to control since it can enter the prism either directly or by reflection from the mirror 34. It is to eliminate these rays that the serration 52 is provided between the prism entrance face 44 and the roof face 48. Stray rays strike the serration 52 at an angle of incidence less than the critical angle so that they are transmitted to the light absorbent coating on the serrations or to some other light absorbing surface within the camera.

Further, a space or gap 60 is provided between the rear edge of the mirror 34 and the face 44 to control stray rays from the upper portion of the field. The gap allows certain of these stray rays to pass from the lens 18 to light absorptive surfaces within the camera, without either impinging on the mirror or entering the prism. The space 60 is as large as practical, but not so large as to eliminate useful rays.

The illustrated camera 10 includes a baffle plate 62 which extends to the intersection of the two extreme rays 30 and 32. This efficiently limits stray light from reaching the film. The camera also can have a hood or shade 6 (not shown) secured above the entrance face of the leading lens element 18a to block certain light rays which exceed the desired angular field of view. Generally the shade and the collimator 62 perform the same function and therefore would not be used together.

The prism 36 is preferably formed from a transparent material having a low optical dispersion such as crown glass, or a plastic such as the acrylic resin material commonly termed plexiglass. In general, glass is a more efficient transmitter of light energy than plexiglass, and because of its higher index of refraction it is generally more conducive to folding a given optical path in a smaller volume. Plexiglass nevertheless is a preferred material where it is desired to produce the camera with relatively low weight and low cost of manufacture. Further, the prism material may also be formed by a liquid encased in a thin transparent shell.

By way of illustration and not limitation, the following Table I gives representative parameters of the optical system according to the invention shown in FIGS. 2 and 3, where the path segments are given in inches, the prism material is plexiglass having an index of refraction approximately 1.5, the film format is 80 millimeters by 80 millimeters, and the objective lens has a focal length of approximately 115 millimeters, and a numerical aperture of approximately $f/8$.

Table I

| Chief Ray 28 | | Lens 18 | |
|---|---|---|---|
| Optical Path Length (Typically) | | Clear Aperture diemeter at Exit Face of | |
| Path Segment 28a (air) | 1.5 | Element 18dd | .500 |
| Path Segment 28b (air) | 1.5 | | |
| Path Segment 28c (medium) | 1.3 | | |
| Path Segment 28d (medium) | 1.5 | | |
| Path Segment 28e (medium) | .9 | | |
| | | Mirror 34 | |
| | | Angle D | 0° |
| Angle C | 55° | Spacing 60 | .100 |
| Angle E | 55° | (Along a | |
| Angle F | 45° | perpendicular to face 44) | |
| | | Prism 36 | |
| | | Angle A | 55° |
| | | Angle B | 27.5° |
| | | Gap 58 | .08 |

The foregoing values describe an embodiment of the invention which optimizes compactness, particularly in the direction perpendicular to the film plane. In particular, the maximum height of the prism in the direction of the arrow 57 (FIG. 2) is approximately 38.5 millimeters, which is slightly smaller than half of one side of the square film frame, and only slightly more than one-third of the film plane diagonal. Moreover, the overall maximum height of the camera measured vertically is approximately 60 millimeters.

The values given in Table I are merely illustrative, and it is possible even for the same film format, lens and prism material to vary these parameters without significant adverse effects on the image quality. In particular, the dimensions of the prism 36 can vary greatly provided that it is large enough to expose all of the film plane but small enough to be relatively compact and lightweight. The configuration of the prism 36 is determined principally by the angles A and B. As discussed above, variations in the angle A are limited by factors such as the desirability of a perpendicular relationship of the entering rays and the entrance face and the desire to reflect internally at the exit face portion 46b as many rays as possible. For a given entrance angle and a given film format and location with respect to the exit face 46, the roof angle B can typically vary within plus or minus one degree, provided all of the film plane is suitably exposed. As a result, the prism 36 can be manufactured with tolerances that are relatively large for optical devices of comparable character. It is also contemplated that changes in orientations of the optical axis 19, the mirror 34, and the prism faces 34 and 48 can accommodate a different lens 18, a different lens location and a different film format.

It is further contemplated that in the embodiment shown in FIGS. 1–3, the region 66 (FIG. 3) bounded by the mirror 34, the prism face 44, the extreme ray 30 and the plane of the face 46 can be occupied by a forwardly extending portion of the prism 36 rather than air. With this alternative arrangment, the upper surface of the forwardly extending prism portion is reflectively coated to perform the same function as the mirror 34. It is also possible, but considered less desirable, to replace the serration 52 with a substantially flat surface extending between the prism faces 44 and 48, provided that this surface is coated with an index matching absorbant material.

Figure 4:
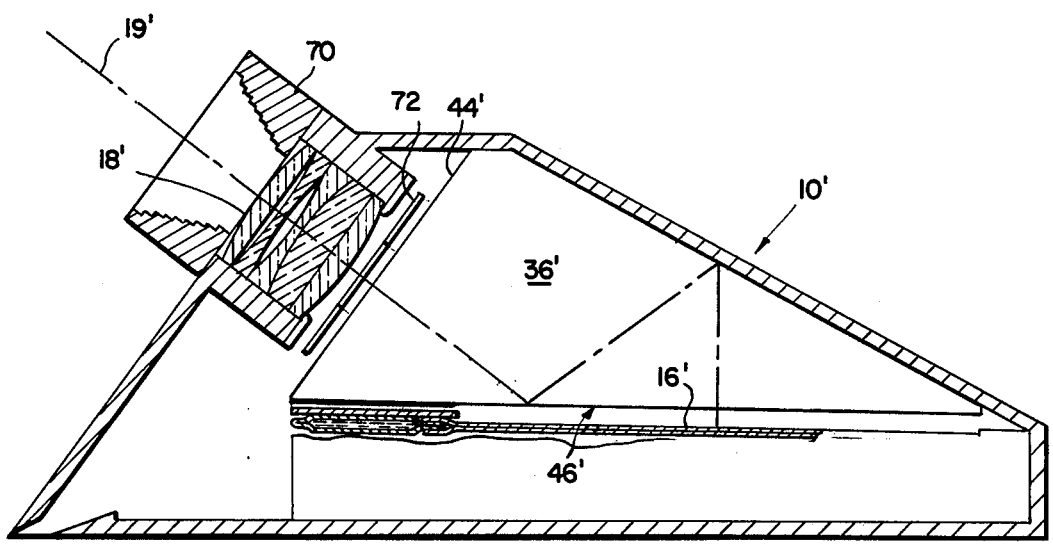
FIG. 4 is a view corresponding to FIG. 2 showing an alternative embodiment of the invention in which light emergent from the objective lens undergoes an even number of reflections before reaching the film plane.

The optical systems in FIGS. 1–3 subject light to an odd number of reflections, which is appropriate for self-developing film of the type marketed by the Polaroid Corporation. FIG. 4, on the other hand, illustrates a simplified embodiment of modifications of the optical system shown in FIG. 1 for use with self-developing film units which require an even number of light reflections. As shown in FIG. 4, the objective lens 18' has its optical axis 19' aligned directly with the entrance face 44' of the prism 36' so that light rays enter the prism substantially along an axis perpendicular to the entrance face and are internally reflected from prism face 46' overlying the film plane 16'. In FIG. 4 the objective lens 18' is similarly aligned to the entrance face 44'. In the FIG. 4 embodiment, a bezel 70 before the lens and an aperture plate 72 positioned between the lens and the prism entrance face are shaped and located to block stray rays that would otherwise enter the prism and impinge on the film plane. It will be understood that the function of the aperture plate 72 could also be performed by an optically absorbent coating on the prism entrance face.

There has been described a compact, rigid camera that utilizes a prism with the camera exposure chamber and which has a reflective and transmissive exit face coextensive with and closely spaced from the film plane to achieve a highly folded optical path in a relatively small volume. A significant advantage of the invention is that it provides a camera construction adapted for use with large-format self-developing film but having a relatively small overall height dimension, i.e. perpendicular to the film plane. This vertical compactness lends itself to a flat, streamlined configuration which is both aesthetically pleasing, readily handled, and conveniently stored and carried. Another advantage is that the optical path can be folded by a prism formed of relatively low weight and low cost plastic. A further advantage of the invention is that stray and other unwanted light can be selectively controlled within acceptable limits through several features which do not significantly increase the cost of the camera's manufacture.

While the invention has been described with respect to preferred embodiments with various alternatives and modifications, other modifications and variations will be apparent to those skilled in the art from the foregoing detailed description and the accompanying drawings. Such modifications are intended to fall within the scope of the appended claims.

I claim:

1. A compact camera for producing an image of an object on film having its photosensitive surface coincident with a film plane, said camera comprising:
   a housing that encloses an exposure chamber;
   lens means mounted on said housing for focusing at said film plane light from within a selected angular field of view; and
   prism means located within said exposure chamber for forming a folded optical path between said lens means and said film plane and having a first face in light receiving optical alignment with said lens means, a second face that overlies and is closely spaced from said film plane and forms a first angle with respect to said first face, said second face being in optical alignment with said first face for receiving and redirecting at least partially by total internal reflection light incident along said optical path on said first face, and a third face that forms an acute second angle with respect to said second face, said first angle being greater than said second angle, said third face being in optical alignment with said second face for receiving and reflecting said internally reflected light onto said second face for transmission through said second face to said film plane.

2. A compact prism camera according to claim 1 wherein said first angle is acute.

3. A compact prism camera according to claim 1 further comprising optical means for directing said light from said lens means to said first face so that said directed light is incident upon said first face substantially along its perpendicular.

4. A compact camera according to claim 3 wherein said optical means comprises a mirror in optical alignment in said optical path between said lens means and said first face.

5. A compact camera according to claim 4 wherein said mirror is oriented with a first edge proximate to said first face and further comprising means forming an optically nonreflective spacing between said first face and said first mirror edge.

6. A compact camera according to claim 1 wherein a portion of said second face adjacent said first face is coated with a light reflective material to direct light, which is incident on said portion of said second face from said first face at an angle of incidence less than the critical angle, to said third face and thereby enhance the compactness of said prism means in a direction perpendicular to said third face.

7. A compact camera according to claim 1 further comprising means for preventing strays rays from propagating within said prism means in a manner to impinge on said film plane.

8. A compact camera according to claim 7 wherein said stray light preventing means comprises at least one serration extending between said first and third faces and having a surface oriented generally perpendicular to said first prism face to transmit stray light incident on said serration surface outwardly from said prism means.

9. A compact camera according to claim 7 wherein said stray light preventing means comprises a coating of light absorptive material applied to the exterior surface of said prism means except said first, second and third faces.

10. A compact camera according to claim 7 wherein said stray light preventing means comprises a baffle extending to a point adjacent the first intersection of the extreme usable rays to provide minimal obstruction to light within said selected angular field of view and to block stray rays originating from outside said selected angular field of view.

11. A compact camera according to claim 6 wherein said stray light preventing means comprises light absorbing surfaces on the side walls of said prism means.

12. A compact camera according to claim 1 wherein said prism means is a transparent optical material having a low dispersion characteristic.

13. A compact camera according to claim 12 wherein said material is glass.

14. A compact camera according to claim 12 wherein said material is a liquid encased in a thin transparent shell.

15. A compact camera according to claim 1 wherein said prism means includes side walls canted inwardly as they extend from said second face.

16. In a camera having an objective lens in optical alignment with a film plane at which the image of an object is focused, the improvement comprising:
   an optical prism element having only three optical wall defining faces, a first, a second and a third, in optical alignment along the camera image path between the object lens and the film plane,
   (1) said first prism face being positioned substantially perpendicular to said image path to receive and introduce to said prism element object image rays directed therealong,
   (2) said second prism face overlying the image plane and obliquely angled relative to said first face for receiving said rays accepted thereat and redirecting a substantial portion of them within said prism element by total internal reflection, and
   (3) said third prism face being angled relative to said second face for receiving said internally-reflected image rays and redirecting them along said image path for incidence, from within said prism element, substantially transversely onto said second face for transmission therethrough to said film plane.

17. The improvement according to claim 16 wherein said angling of said first face relative to said second face being greater than said angling of said third face relative to said second face.

18. The improvement according to claim 16 wherein a portion of said second face adjacent said first face is coated with light reflective material to direct light, which is incident on said portion of said second face from said first face at an angle of incidence less than the critical angle, to said third face and thereby enhance the compactness of said prism element in a direction perpendicular to said third face.

19. A compact camera for producing an image of an object on self-developing film having its photosensitive surface coincident with a film plane, said camera having the improvement comprising:
   a rigid housing that encloses an exposure chamber
   lens means mounted on said housing for focusing at said film plane light from within a selected angular field of view;
   prism means located within said exposure chamber for forming a folded optical path between said lens means and said film plane and having a first face in light receiving optical alignment with said lens means, a second face that overlies and is closely spaced from said film plane and forms a first acute angle with respect to said first face, said second face being in optical alignment with said first face for receiving and redirecting a substantial portion of them by total internal reflection light incident along said optical path on said first face, and a third face that forms a second acute angle with respect to said second face, said first angle being greater than said second angle, said third face being in optical alignment with said second face for receiving and reflecting said internally reflected light onto said second face for transmission through said second face to said film plane, one portion of said second face adjacent to said first face being coated with a light reflective material to direct light incident on said portion of said second face from said first face at an angle of incidence less than the critical angle to said third face, said camera having a maximum dimension in a direction perpendicular to said film plane less than the maximum linear dimension of said film.

20. A compact camera according to claim 19 wherein said prism means is a transparent low dispersion plastic material and said second acute angle is approximately 28°.

21. A compact prism camera according to claim 19 wherein the other portion of said second face is coextensive with said film and coated with an anti-reflection material.

22. In a compact camera for producing an image of an object on film having its photosensitive surface coincident with a film plane, said camera having a housing enclosing an exposure chamber, a lens arrangement mounted on said housing for focusing at said film plane light from within a selected angular field of view, and optical means within said exposure chamber for forming a folded optical path between said lens arrangement and said film plane, the improvement comprising:

said optical means including a prism arrangement having a first surface in light-receiving optical alignment with said lens arrangement, a second surface overlying and spaced from said film plane in an optical alignment with said first surface for receiving and redirecting by total internal reflection light incident along said optical path and entering said prism arrangement through said first surface, and at least one additional surface oriented in optical alignment with said second surface for receiving and reflecting said internally-reflected light back onto said second surface substantially transverse thereto for transmission through said second face to said film plane.

23. A compact camera according to claim 22 wherein said second light redirecting and transmitting surface is substantially coextensive with said film plane.

24. A compact camera according to claim 22 in which said second surface is substantially planar and spaced closely from said film plane.

25. A compact camera according to claim 22 wherein said first and said second surface form between them an acute angle such that light incident on said second surface from said first surface exceeds the critical angle of the material forming said prism means.

26. A compact camera according to claim 22 wherein said prism arrangement is of transparent plastic material having relatively low optical dispersion.

27. A compact camera according to claim 22 in which said optical means subjects said light being focused to an even number of reflections in the passage thereof from said lens arrangement to said film plane.

28. A compact camera according to claim 22 in which said optical means subjects said light being focused to an odd number of reflections in the passage thereof from said lens arrangement to said film plane.

29. In a camera having an objective lens in optical alignment with a film plane at which the image of an object is focused, the improvement comprising:

an optical prism element having at least first, second and third faces in optical alignment along the camera image path between the lens and the film plane;

said first prism face being positioned substantially perpendicular to said image path to receive and introduce to said prism element image forming rays directed therealong;

said second prism face overlying the image plane and obliquely angled relative to said first face for receiving said rays accepted thereat and redirecting them within said prism element by total internal reflection; and said third prism face being angled relative to said second face for receiving said internally-reflected image rays and redirecting them along said image path for incidence, from within said prism element, substantially transversely onto said second face for transmission therethrough to said film plane.

30. The improvement according to claim 29 wherein said first and second prism faces intersect to form an acute angle.

* * * * *